March 6, 1951 D. H. MONTGOMERY 2,543,927
GEAR-SHIFTING MECHANISM
Filed May 14, 1948
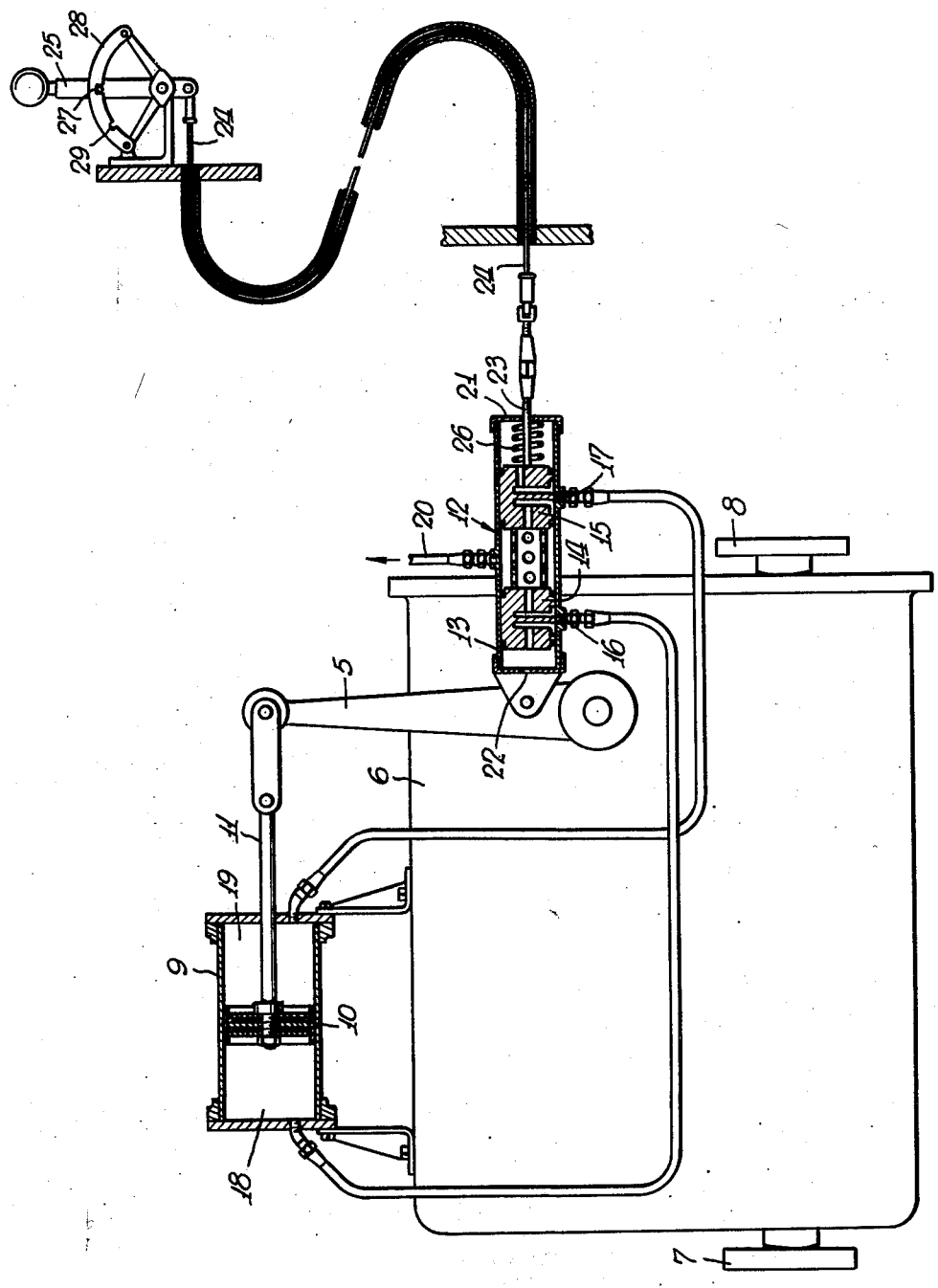
INVENTOR
Donald H. Montgomery
BY
ATTORNEYS Patented Mar. 6, 1951

2,543,927

UNITED STATES PATENT OFFICE 2,543,927

GEAR-SHIFTING MECHANISM

Donald H. Montgomery, West Hartford, Conn.

Application May 14, 1948, Serial No. 26,944

5 Claims. (Cl. 74—335)

My invention relates to a control system for a power-transmission unit and in particular to a remote-control system having special application to the control of a motorboat drive system.

It is an object to provide an improved system of the character indicated.

It is another object to provide an improved gear-shifting control means wherein the system is biased in the direction of selecting a reverse-drive connection and wherein a deliberate manual control and a holding operation are necessary in the selection of a forward-drive connection.

It is a specific object to meet the above objects with an inherently simple system adaptable to existing craft with little expense.

Other objects and various further features of the invention will be pointed out or will occur to those skilled in the art from a reading of the following specification in conjunction with the accompanying drawing. The drawing shows a partly sectioned simplified layout of a control system incorporating features of the invention.

In the handling of power craft it frequently occurs that remotely operated gear-shifting mechanisms fail or malfunction at moments of greatest embarrassment, and such failures may mean an inability to disengage a forward drive, while attempting to shift into a neutral position or into reverse. Such failures may produce costly damage if they occur just when it is necessary to avoid collision with another craft or when attempting an approach to a landing dock. The problem is an immediate one for all craft now in use, as well as for boats of the future.

With my invention I seek to avoid such embarrassment and damage by employing a remotely controlled gear-shifting mechanism that is readily adaptable to existing craft and biased in favor of reverse connections; deliberate manual operations are necessary to call for neutral and forward gear-shifting positions, and if there should be a failure of any sort in the manual control, the bias may tend automatically to shift the drive into reverse. Necessarily then, any shifting into reverse is simplified, and it will always be possible to call for a reverse drive in an emergency. In the preferred form to be described, a vacuum-operated servo-mechanism is employed directly to actuate the gears, and a spring within the servo-mechanism biases servo-mechanism operation in favor of reverse drive connections. A flexible cable, such as a Bowden wire extending to a lever or other manual actuating means at the control bridge, may be employed to operate the servo-mechanism.

Referring to the drawing, my invention is shown in application to the remote control of gear-shifting means in the form of a crank 5 for the gear box 6 of, say, a power launch. The gear box 6 may include an input or driven flange 7 for direct coupling to an engine, and an output or driving flange 8 for coupling to the propeller shaft of the craft. The crank 5 is shown in neutral position, but it will be understood to be actuable to the right (clockwise in the sense of the drawing) for forward-drive connections and to the left (counterclockwise) for reverse-drive connections.

In accordance with the invention, I employ a flexibly controlled, biased servo-mechanism in the remote actuation of the gear-shifting crank 5. Fluid-pressure-responsive means, such as a double-acting cylinder 9, may be employed for driving a piston 10 in the direct actuation of crank 5 through piston rod 11. Pilot-valve means 12 for the double-acting cylinder 9 may include two relatively movable parts. In the form shown, a first part is a casing or cylinder 13 in which two discs 14—15 of a second part are slidable. Each of the discs 14—15 has a high pressure side and a low pressure side and is positioned with respect to a control port (16—17, respectively) for the selective admission of relatively high and relatively low pressures to the head end 18 and to the tail end 19 of the cylinder 9.

In the preferred form shown, the pilot valve 12 serves to effect operations within cylinder 9 through the controlled admission of partial vacuum pressures. The space between discs 14—15 may, therefore, be in fluid communication with the vacuum or intake manifold of the engine (not shown), and the pipe 20 will be understood to make such connection. Relatively high pressures may be obtained by admission of air at atmospheric pressure to the other ends of discs 14—15 as through the openings 21—22. To complete the structure, and for ready adaptability to all types of craft, the second pilot-valve part, that is, the discs 14—15, may be moved in unison by a stem 23 connected to a flexible actuating cable 24 of the type frequently known as a Bowden wire. At the other end of the control wire 24, say on the bridge of the craft, a hand lever 25 may be cranked for the desired operation of the discs 14—15 of pilot valve 12.

In operation, a shift of the control lever 25 counter-clockwise (that is, to the left in the sense of the drawings) will call for a forward engagement of the gears within the box 6. This shifting of the lever 25 will be understood initially to move the discs 14—15 to the right, relatively to the pilot-valve cylinder 13. Upon such movement, relatively high-pressure air, that is, air at atmospheric pressure, may flow through opening 22 past disc 14 and into the head end 18 of cylinder 9. At the same time, the vacuum will be connected directly to the tail end 19 of the cylinder 9 via the disc 15. The resultant motion of piston 10 will operate crank 5 to the right and thus also displace cylinder 13 to the right, and it will be understood that the ports 16—17 will be closed off or balanced one against the other when the crank 5 is positioned as ordered by the master control lever 25. In like manner, it will be understood that a shifting of the control lever 25 to the right may cause reverse connection of the gears by positioning the crank 5 to the left of the position shown.

In accordance with a feature of the invention, I provide means within the servo-mechanism for biasing operation in favor of reverse-gear connections and in the form shown, I employ for this purpose resilient means, such as a spring 26, urging the two pilot-valve parts relatively to each other in the direction to cause reverse-gear connections. The spring 26 may thus serve to stress the cable 24 constantly in tension. It will be understood that since the system is biased in favor of reverse connections, positive actuation will be required of the hand-control lever 25 in order to effect either neutral or forward-gear connections, and, if desired, holding means may be employed to hold such connection. In the form shown, a notch 27 on a sector plate 28, which forms part of the mounting frame work for the lever 25, may be engaged by a lock or other part of the lever 25 in order to hold neutral gear connections, and a similar notch 29 may hold forward gear connections. In order that forward engagement may be positive regardless of wear in parts such as clutch means within the gear box 6, I prefer that the notch 29 be positioned to allow for further movement of lever 25 beyond notch 29. It will be understood that such movement may permit firm initial clutch engagement within the gear box 6 upon initial selection of forward speeds.

It will be seen that I have described a relatively simple mechanism that may be easily adapted to many types power craft for biasing gear selection in favor of reverse-gear connections. With my system, regardless of the emergency it will always be possible to shift into reverse. A touch of the control lever 25 may engage either one of the latched positions 27—29, with immediate selective operation of lever 5. Should the Bowden cable 24 break or should any pins become severed, the spring 26 will again urge the system to select reverse-gear connections.

While I have described my invention in detail for the preferred form shown, it will be understood that modifications may be made within the scope of the invention as defined in the appended claims.

I claim:

1. In a transmission-control system of the character indicated, gear-shifting means including lever means having a first position for a forward drive and a second position for a reverse drive, double-acting vacuum-responsive actuating means for said lever means, reversing pilot-valve means for said vacuum-responsive means and including two relatively movable parts for the selective operation of said actuating means, one of said parts being carried with said lever means, pilot-valve actuating means including a flexible cable connected to the other of said parts, and resilient means urging said parts with respect to each other in a direction to cause actuation of said crank into said second position.

2. A transmission-control system according to claim 1, in which said gear-shifting means has a neutral position for no drive, and in which holding means is engageable with said manual-control means to hold said manual-control means for selective retention of said first position of said gear-shifting means and of said neutral position of said gear-shifting means.

3. A system according to claim 1, in which said resilient means urges said parts in a direction to increase tension in said flexible cable.

4. In a transmission-control system of the character indicated, gear-shifting means including a crank having a first position for a forward drive and a second position for a reverse drive, double-acting fluid-pressure-responsive actuating means for said crank, reversing pilot-valve means for selective operation of said actuating means and including two relatively movable parts, one of said parts being pivotally connected to said crank, whereby said one part may follow the actuation of said crank, a flexible control cable connected to the other of said parts, and resilient means urging said cable in a direction of increasing tension, said pilot-valve means being connected to said pressure-responsive actuating means in such a way that upon the urging of said resilient means said pilot-valve parts are displaced relatively to each other in a direction to cause placement of said crank in said second position.

5. A system according to claim 4, in which said fluid-pressure-responsive actuating means is vacuum operated, with the high-pressure sides thereof open to atmospheric pressure.

DONALD H. MONTGOMERY.

REFERENCES CITED

The following references are of record in the file of this patent:

UNITED STATES PATENTS

| Number | Name | Date |
|---|---|---|
| 1,217,119 | Curtis | Feb. 20, 1917 |
| 1,963,444 | Mullins | June 19, 1934 |
| 2,140,095 | Theed | Dec. 13, 1938 |
| 2,152,914 | Price | Apr. 4, 1939 |
| 2,186,653 | Penote | Jan. 9, 1940 |
| 2,291,411 | Randol | July 28, 1942 |
| 2,398,407 | Brownyer | Apr. 16, 1946 |

FOREIGN PATENTS

| Number | Country | Date |
|---|---|---|
| 431,295 | Great Britain | July 4, 1935 |